Figure 1:
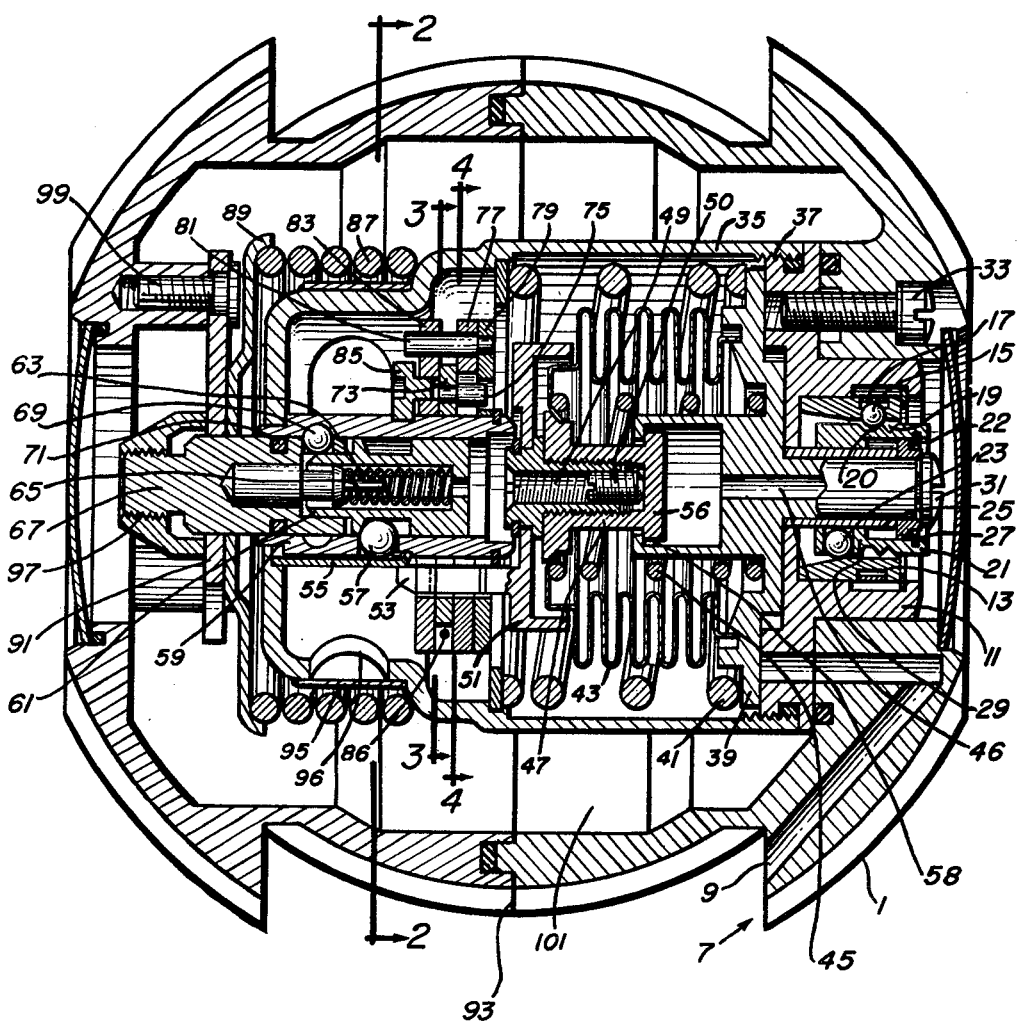

Feb. 23, 1965   T. R. PAULSON ETAL   3,170,398
BAROMETRIC MUNITION
Filed May 11, 1961   2 Sheets-Sheet 1

INVENTORS
Theodore R. Paulson
Paul F. Shivers

BY George Renehan
ATTORNEY

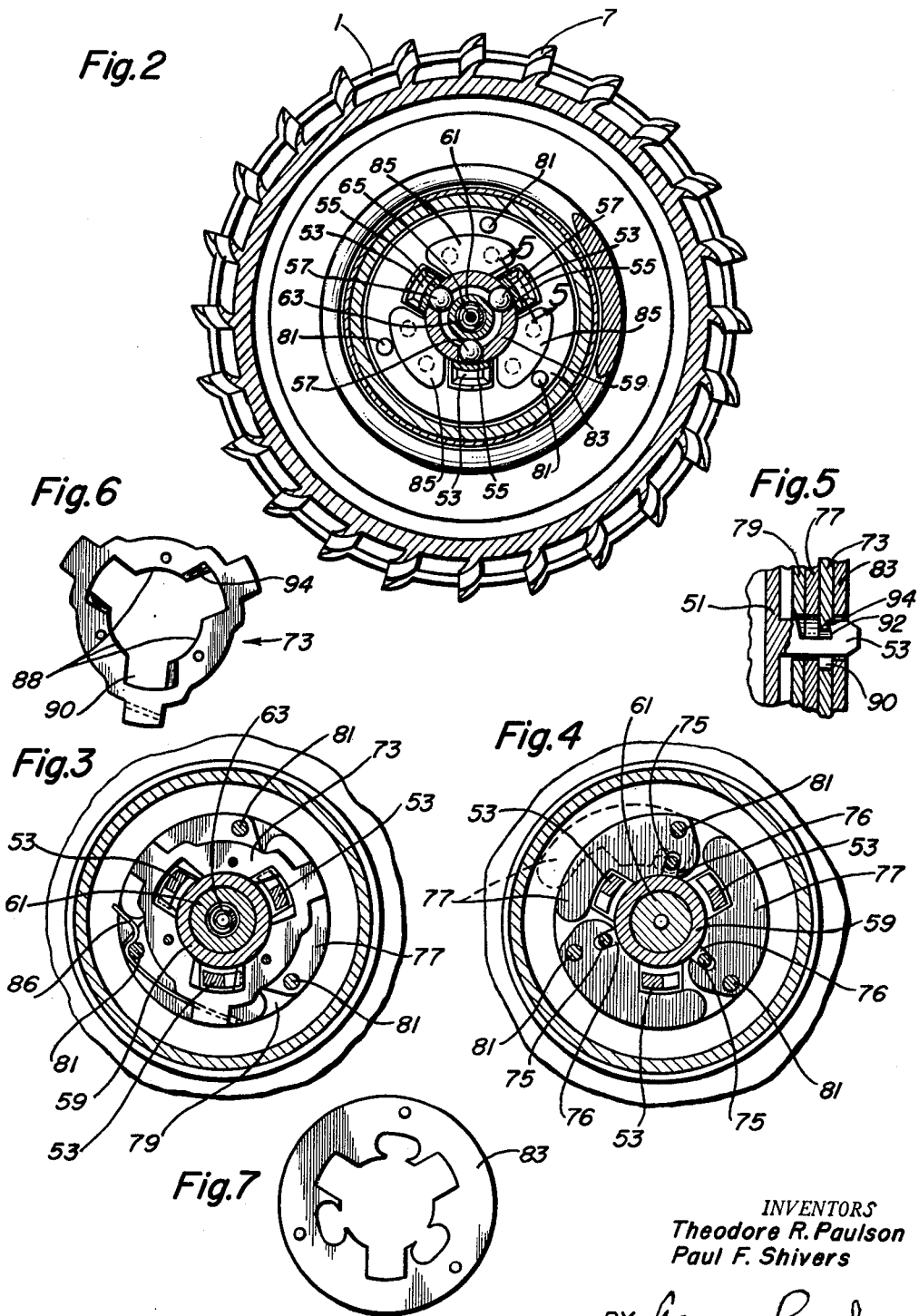

United States Patent Office 3,170,398
Patented Feb. 23, 1965

1

3,170,398
BAROMETRIC MUNITION
Theodore R. Paulson, Abingdon, Md., and Paul F. Shivers, Minneapolis, Minn., assignors to the United States of America as represented by the Secretary of the Army
Filed May 11, 1961, Ser. No. 109,463
3 Claims. (Cl. 102—6)
(Granted under Title 35, U.S. Code (1952), sec. 266)

The invention described herein may be manufactured and used by or for the Government of the United States of America for governmental purposes without the payment to us of any royalty thereon.

This invention relates to a barometric munition so constructed that it will disperse fluent substances at any atmosphere level within a given range.

It is an object of this invention to develop a barometric munition to disperse substances, usually having biological activity, e.g. chemical, biological or radiological warfare agents, at various heights without the use of explosive or heating means which would seriously limit or destroy the effect of heat-sensitive substances.

In the accompanying drawings:

FIG. 1 is a longitudinal sectional view of the barometric munition.

FIG. 2 is a transverse sectional view of the barometric munition, taken on the line 2—2 of FIG. 1.

FIG. 3 is a partial transverse sectional view of the barometric munition taken on the line 3—3 of FIG. 1.

FIG. 4 is a further partial transverse sectional view of the barometric munition taken on the line 4—4 of FIG. 1.

FIG. 5 is a transverse sectional view taken on the line 5—5 of FIG. 2.

FIG. 6 is a frontal view of the spider ring in the arming assembly.

FIG. 7 is a frontal view of the arming weight mount.

The barometric munition comprises a casing 1 which is fluted 7, to create a spin about the horizontal axis in FIG. 1, when in flight. A channel 9 is positioned within the casing 1 so as to permit air to enter barometric mechanism.

Adjacent to the channel 9 and at a first end of the barometric munition is the clutch base 11. The clutch base 11 forms part of the clutch assembly which also comprises a clutch ring 13 which fits snugly in clutch base 11. A first series of three balls 15 are retained by a spring retainer 17 between clutch ring 13 and one of two annular grooves 19, 20, formed in a clutch sleeve 21. These form a part of the clutching assembly. A clutch sleeve washer 22 is fixed to clutch sleeve 21. Other components of the clutch assembly are a second series of six balls 23 which are positioned between a shank sleeve 25, the clutch ring 13 and the clutch sleeve 21, to provide a clutching means. The shank sleeve 25 has a shank sleeve shoulder 27 which cooperates with a clutch sleeve shoulder 29 of the clutch sleeve 21 when sufficient air pressure is applied through channel 9. A bolt 31 secures the clutch assembly in the clutch base 11 while a series of three bolts 33 fasten the clutch base 11 to the casing 1. A housing cup 35 is screwed at 37 to the clutch base 11.

Attached to the shank sleeve 25 and at the end of the first channel 9 within the barometric munition is a bellows head 39. The bellows head 39 is held against the clutch base 11 by a bellows assembly spring 41. A bellows 43 is expanded by a bellows spring 45. Bellows 43 is evacuated through bore 46, which is then plugged. Within the bellows 43 is a bellows bushing 47 which is connected to latch 51 by a latch screw 49 containing a set screw 50 which presses against the bottom of 47. The latch screw 49 is connected to a latch 51 and the latter includes three latch fingers 53, to provide cooperation between the bellows assembly and a series of three locking ball retainers 55 of the locking assembly. Bellows bushing 47 also is provided with an enlarged head 56 which fits within a socket 58 integral with bellows head 39.

2

The three locking ball retainers 55 restrain a series of three locking balls 57 from being released from a locking pin sleeve 59. The locking pin sleeve 59 cooperates with an adjacent inner locking sleeve 61 which in turn compresses locking sleeve spring 63 mounted on a locking sleeve spring guide 65. The locking sleeve spring guide 65 is mounted on a locking pin 67. Three locking balls 69 are wedged between the inner locking sleeve 61, the locking pin 67, and the locking pin sleeve 59. O rings 71 seal the locking pin sleeve 59 and the locking pin 67.

A spider ring 73 is rotatably mounted on locking pin sleeve 57. Three spider ring pins 75 are attached to the spider ring 73 and ride in the slots 76 of three arming weights 77 which are mounted on an arming weights mount 79. The arming weights 77 pivot about three arming pins 81. These three arming pins 81 also fit in holes in plate 83. The plate 83 is itself mounted on the arming assembly mount 85, which is rigidly secured to sleeve 59. A spider ring spring 86 engages spider ring 73 and one of the pins 81, as shown in FIG. 3.

Adjacent to the locking assembly and at a second end of the barometric fuze is the firing assembly. The firing assembly includes a pusher spring 87 which acts on a pusher plate 89. The latter in turn acts on a mounting plate 91 to divide the barometric munition at joint 93. Sealing ring 95 covers ports 96 of the housing cup 35. The locking pin 67 is screwed into the mounting plate 91 at 97 and the mounting plate 91 is fastened to the casing 1 by three screws 99.

Attention is now called to FIGS. 5 and 6. The spider ring 73 comprises three lugs 88 separated by notches 90. One edge of each lug 88 is engaged by a hook portion 92 of one of the fingers 53. The cooperating edge of each lug 88 is preferably formed with a shallow dovetail 94 to give a more secure engagement with hook 92. It will be noted that notches 90 are somewhat wider than fingers 53, as so to permit a slight rotary movement of spider 73 relative to fingers 53.

Casing 1 and housing cup 35 define a chamber 101 which receives a charge of dispersible material. The material may be particulate solids, a suspension of particulate solids in a liquid, either volatile or non-volatile, or a gas. Since the munition operates without the use of heat or explosives, it is particularly desirable for dispersing heat or explosive-sensitive materials.

The two hemispheres are held together against the action of spring 87 by the locking means formed by locking pin 67, locking balls 69, locking sleeve 61, locking pin sleeve 59, locking balls 57 and locking ball retainers 55. This locking means serves to prevent movement between housing cup 35, which is joined to the right hemisphere. The locking means is thus under tension while spring 87 is under compression.

*Altitude setting*

The clutching assembly can be set for any desired height by first exerting a desired air pressure on the barometric release mechanism through channel 9. This set pressure will position the shank sleeve shoulder 27 at a specific distance from the clutch sleeve shoulder 29. The pressure is then released and the bellows assembly is set to operate at a specific atmospheric pressure and not at a lower pressure. A lower pressure would not compress the bellows because the bellows head spring 45 has already been set for the higher pressure by the clutching assembly.

When setting the clutch assembly, the first series of balls 15 will be set in the grooves 20 of clutch sleeve 21.

The second series of balls 23 together with the shank sleeve 25 and the clutch ring 13 act as a one way clutch and thus set the clutch assembly for the desired atmospheric height.

Movement of shank sleeve 25 to the left causes a rotation of balls 23 in a direction (counterclockwise in the case of the ball visible in FIG. 1) which causes a lower pressure between members 21, 23, and 25. Any attempt to move shank sleeve 25 to the right causes rotation of balls 23 in such a direction as to increase that pressure, giving a wedging action.

These second balls 23 permit the shank sleeve 25 to move to the left relative to clutch sleeve 21 and clutch ring 13 only up to the point when the shank sleeve shoulder 27 strikes the clutch sleeve shoulder 29. Any further movement by the shank sleeve 25 to the left will cause the release of the wedging action of the second series of balls 23 due to the tapered clutch ring 13.

To reset the clutching assembly at a zero position, a higher pressure must be exerted on the bellows head 39 through the channel 9 which will cause the bellows head 39 to move to the left and thus move shank sleeve 25 to the left since it is attached to the bellows head 39. The shank sleeve shoulder 27 will strike the clutch sleeve shoulder 29 and cause the first series of balls 15 to move over the action of the spring retainer 7 into groove 19 of the clutch sleeve 21.

Upon release of the pressure, bellows head 39 and shank sleeve 25 move to the right relative to clutch ring 11 and clutch sleeve 21 until shank sleeve shoulder 27 engages clutch ring washer 22. Clutch sleeve 22 is then moved to the right, relative to clutch ring 11, snapping balls 15 back into groove 20. Balls 23 are then in locking position and prevent further movement of clutch sleeve 25 to the right. The mechanism is then in the "zero" position, ready for the application of a desired pressure through channel 9 to set the mechanism for operation at a given barometric pressure.

Since the adjustment is made by air pressure a large number of individual munitions may be adjusted simultaneously by placing them in a container, pressurizing the container and then releasing the pressure. The container may be, for example, a cluster adapter or a missile warhead.

*Operation*

The atmospheric pressure at ground level compresses the bellows 43 against the action of the bellows spring 45. Channel 9 equalizes pressure inside housing cup 35 with that of the atmosphere. Compression of the bellows 43 causes the bellows bushing 47 to move to the right and thus causes the latch 51, which is attached to the bellows bushing 47 and the latch fingers 53 also to move to the right against the spider ring 73 and thereby hold the latter against movement. Thus a safety feature exists at ground level to prevent premature firing.

At high altitude, the spring 45 expands the bellows. Spider ring 73 is free to turn since there is no pressure exerted on it by latch fingers 53. When the barometric munition is released and in flight, the flutes 7 cause spinning and as the munition descends increased air pressure is applied against the bellows through channel 9.

The spider ring spring 86 acts to normally maintain the spider ring in the latched position, engaging fingers 53. However, before the desired atmospheric level is reached the arming weights 77 will pivot about the arming pins 81 due to the centrifugal force created by the spinning munition. This pivoting of the arming weights 77 causes the spider ring pins 75 which ride in the slots of the arming weights 77 to turn the spider ring 73. The spider ring 73 thus rotates away from its latched position with the latch fingers 53. This permits the latch finger 53 to move to the right without contacting the spider ring 73 when the bellows 43 is compressed.

When the munition has fallen to the desired altitude, the atmospheric pressure has compressed bellows 43 against the force of the bellows spring 45, causing the bellows bushing 47 to move to the right, together with latch 51 and its fingers 53. As the latch finger 53 moves to the right, the locking ball retainers 55 are disengaged and they drop away, permitting the release of the locking balls 57. This enables the inner locking pin 61 to move to the right under the force of the locking pin spring 63. When the left hand end of inner locking pin 61 clears balls 69, the latter are free to move inwardly, away from sleeve 59. Thus, the locking pin 67, which is attached to the pusher plate 89, is free to slide in the inner locking sleeve 59. Now the pusher spring 87 pushes against the pusher plate 89 and the housing cup 35. This forces the two hemispheres of the barometric munition apart at joint 93 since the pusher plate 89 is attached to the mounting plate 91 which is connected to the left hemisphere while the housing cup 35 is attached to the clutch base 11 which is connected to the right hemisphere. After separation of the hemispheres, the toxic substances contained in chamber 101 are released.

While we have described one embodiment of our invention, it will be obvious that various changes may be made. We therefore wish our invention to be limited solely by the scope of the appended claims.

We claim:

1. A barometric munition comprising two separable sections, means to cause said munition to spin during flight, a spring within said munition compressed between said separable sections and tending to force said sections apart, a locking means within said munition holding said sections together against the action of said spring, an evacuated bellows within said munition, a bellows spring tending ot expand said bellows, means for adjusting the tension on said bellows spring, means operable on compression of the bellows against the action of said bellows spring to unlock said locking means, a passage so arranged as to transmit exterior pressure to said bellows, latch means constructed and arranged to prevent compression of said bellows, centrifugally actuated arming means for releasing said latch means, vanes on said munition adapted to cause said munition to rotate while falling, means for normally rendering said arming means inoperative and means operable on expansion of said bellows for rendering said arming means operative, whereby said sections will be pushed apart by said spring only when said munition is taken to an altitude above a predetermined altitude, and then allowed to fall freely to said predetermined altitude.

2. A barometrically actuated munition comprising two separable sections, a spring within said munition urging said sections apart, a locking means holding said sections together against the action of said spring, an evacuated bellows within said munition, a bellows spring tending to expand said bellows, unlocking means connected with a first end of said bellows, operable to unlock said locking means on compression of said first end of said bellows against the action of said bellows spring, arming means operable to normally prevent siad compression of said first end of said bellows, means for adjusting the tension of said bellows spring comprising a movable bellows head secured to the second end of said bellows, a one-way clutch operatively connected to said bellows head, said clutch being operative to permit movement of said bellows head in a direction such as to compress said bellows and prevent movement in the reverse direction, and a passage admitting air from the exterior of said munition to the exterior of said bellows within said munition.

3. A barometric munition comprising a casing formed of two separable sections, a spring within said munition urging said sections apart, a separable locking means holding said sections together against the action of said spring, barometric release means for unlocking said locking means, and centrifugally actuated arming means for rendering said barometric release means operative, said locking means comprising locking balls so positioned as to prevent movement between two relatively movable members, a retaining means holding said balls in position, said release means comprising latch fingers normally engaging said retaining means in such a manner as to hold said retaining means and said balls in position and a barometrically actuated bellows attached to said fingers in such a manner as to draw said fingers out of engagement with said retaining means when said munition has fallen to a predetermined altitude, said bellows having a direction of movement along its axis, said arming comprising a spider ring positioned in a plane transverse in said axis and comprising lugs normally cooperating with said fingers in such a manner as to prevent movement of said fingers away from said retaining means, and at least one arming weight pivotally mounted on said arming means and engaging said spider ring in such a manner as to rotate said ring and move said lugs out of engagement with said fingers when said munition spins.

References Cited by the Examiner

UNITED STATES PATENTS

| | | | |
|---|---|---|---|
| 2,341,351 | 2/44 | Barkley | 102—9 |
| 2,412,387 | 12/46 | Britton | 202—9 |
| 2,442,381 | 6/48 | Short | 102—6 X |
| 2,920,570 | 1/60 | Martin et al. | 102—79 X |

BENJAMIN A. BORCHELT, *Primary Examiner.*

ARTHUR M. MORTON, SAMUEL BOYD, SAMUEL FEINBERG, *Examiners.*